Patented Feb. 18, 1941

2,232,294

UNITED STATES PATENT OFFICE 2,232,294

PROCESS FOR TREATING LIQUIDS

Oliver M. Urbain and William R. Stemen, Columbus, Ohio, assignors to Charles H. Lewis, Harpster, Ohio No Drawing. Application July 8, 1938,
Serial No. 218,219

8 Claims. (Cl. 210—2)

This invention relates to the purification of polluted liquids. More particularly, it relates to precipitation processes for separating polluting substances from liquids and industrial wastes, and removing in general all organic matter present in polluted liquids.

It has been recognized that polluting organic substances are present in liquids in three phases, namely, (1) as suspended matter, (2) as colloidal matter, and (3) as matter in true solution. A complete purification of a liquid requires the elimination therefrom of the organic matter present in each of these forms.

The relative putrescibility of the different fractions of the organic matter present in a polluted liquid is indicated by the per cent of the ten-day bio-chemical oxygen demand attributable to each fraction. In normal sewage these percentages are about as follows:

Suspended matter ____ 35% of the 10-day B. O. D.
Colloidal matter_____ 53% of the 10-day B. O. D.
Dissolved matter _____ 12% of the 10-day B. O. D.

Processes for the removal of suspended, colloidal and dissolved matter have heretofore been proposed and have met with a modicum of success. These processes, in general, effect removal of organic matter by coagulation of suspended particles consisting of or having adsorbed thereon the organic matter.

For example, the organic materials in true solution are adsorbed by utilizing an adsorbing agent which is susceptible of coagulation. Certain adsorbents having a sufficient active surface and adsorption capacity are used in proper proportions to effect a substantially complete adsorption of the organic matter in true solution from a polluted liquid. Such an adsorbent agent must be one which is susceptible of coagulation, and possess the property of holding the adsorbed material during the coagulation step.

The organic matter present in colloidal form may be effectively removed by first desolvating and flocculating such organic matter and thereafter coagulating the suspended matter formed by the flocculation. The desolvation and flocculation is effected by first adding an efficient electrolyte such as ferric chloride which ionizes and hydrolyzes, and thereafter adjusting the pH of the liquid to from 9.5 to 10.0. The colloids in the alkaline solution take on high negative charges, and the electrolyte provides positive ions which combine with the negatively charged colloids and flocculate such colloids in the form of suspended matter.

The removal of suspended matter in such liquid is commonly effected by adding thereto a coagulant which gathers together the suspended particles. Such a process is termed coagulation. It will thus be seen that by effecting flocculation of the colloid, and adsorption of the matter in true solution, in the presence of the normally suspended matter, all of the organic matter is brought into a state of suspension which may thereafter be coagulated by the addition of a suitable coagulant.

It is well known that in processes involving coagulation of suspended matter, a period of from two to four hours is required for the precipitate to settle sufficiently before the purified liquid can be drawn off. The sedimentation period required varies with the type of coagulant employed. Of the common coagulants employed, the aluminum and ferric salts produce a precipitate which settles at a slower rate than that produced by ferrous salts. Aluminum coagulants are the most common in liquid treatment processes and these require a sedimentation period of from three to four hours. This necessitates sedimentation basins of enormous capacity where large quantities of liquids are processed. The activated sludge processes and the biological processes require sedimentation tanks of even greater capacity. A further problem met with in the known processes of coagulation is the large volume of sludge obtained by such methods.

It is an object of this invention to provide a process wherein the sedimentation period for coagulation processes can be materially reduced. A further object of the present invention is to provide a process yielding a much smaller volume of sludge than that obtained by present processes. Further objects of this invention are to provide processes by which suspended matter may be removed from rapidly flowing water and by which the movement of the sludge so obtained might be controlled by forces other than the force of gravity. A further and more specific object of this invention is to provide a process whereby the sedimentation of wastes of high specific gravity can be effected without first diluting the raw wastes. This object is particularly directed toward the removal of suspended matter in such highly concentrated wastes as whey and those from distilleries, yeast plants, and strawboard mills.

Other and further objects of the invention will become apparent as the description of the process is developed.

It has now been discovered that, through the use of magnetic materials, such as natural and artificial magnetites, iron, cobalt, nickel, and alloys of these metals, organic materials which have been converted into suspended matter may be much more rapidly coagulated in the form of a sludge having a much smaller volume for the same quantity of organic materials removed. The sedimentation of the suspended matter is effected by adding such magnetic materials thereto and employing an electro-magnetic field below the sedimentation tanks to carry down the magnetic and suspended matter.

Such materials thus become effective water purification agents which, due to their magnetic properties, are capable of facilitating the coagulation of the natural occurring suspended matter, the suspended matter resulting from desolvation and flocculation of colloidal organic matter and the suspended matter containing the adsorbed organic particles, when employed in connection with an electro-magnetic field. A more detailed description of this newly discovered process now follows.

To effect magnetic flocculation of suspended material, the usual coagulating agents such as ferrous sulfate, aluminum sulfate, sodium aluminate, chlorinated copperas, etc., are added to the liquid containing suspended materials and there is additionally added a quantity of powdered magnetic material. The quantities employed will vary depending upon the quantity of suspended materials to be coagulated, but it has been found that the addition of 200 to 500 pounds per million gallons of liquid being treated is sufficient for the average sewage or polluted liquid.

As has been pointed out, the magnetic materials employed may be natural or artificial magnetite, iron, cobalt, nickel, and alloys of these metals. Magnetite is the preferred magnetic material employed in these processes, because of the large quantities available at very low costs. Magnetite is a ferroso-ferric oxide having the formula $FeO.Fe_2O_3$, i. e., a combination of ferrous and ferric oxides. It is a very cheap iron ore widely distributed in nature. It is also a waste product of many mining operations and a waste by-product of a number of metallurgical processes. Metallic iron, cobalt and nickel, when finely powdered, are suitable magnetic materials for facilitating the coagulation of suspended matter. Alloys containing these elements in quantities sufficient to impart magnetic properties to the alloys may also be used. However, the cost of such alloys or the metallic elements is somewhat greater than the cost of either natural or artificial magnetite, thus making the latter the more preferred of the magnetic coagulating agents.

An electro-magnet is installed in the bottom of the settling tank, and is utilized to effect the magnetic flocculation. The rate of settling of the floc will depend upon the intensity of the magnetic field and the depth of the tank. Electro-magnets exerting a considerable magnetic field are commercially available and may be utilized in this process. The electro-magnets may be constructed as baffle plates, grid-type plates, or in any suitable design to conform with the tank design. The magnetic field should be of such area as to cover the entire bottom of the sedimentation tank. The electro-magnet may be stationary or movable. If it is desired to move the coagulated sediment to a definite location in the tank, this can be done with movable magnets. It has been found advantageous to employ soft core magnets which are magnetized only while being supplied current. This makes possible the control of the movement of the sludge and permits the sludge to be released when the current is cut off.

The great rapidity of settling of a magnetic floc under the influence of an electro-magnet is shown by the following representative set of results:

EXAMPLE

One thousand parts of sewage was treated with four parts of ferric chloride in solution and agitated for four minutes. Ferric chloride was employed as the coagulant because it is in common general use for both potable and polluted waters. The customary proportional parts of Cottrell dust and hydrated lime were added to sample A and the mixture agitated for four minutes. In samples B and C, natural magnetite was substituted for the Cottrell dust. Sample C was placed in the field of an electro-magnet. Measurement of the rate of settling of the floc in centimeters at definite time intervals, was made on each of the three samples. At the end of the settling period, the volume of sludge was measured for each sample. The results are tabulated in Table 1 below:

Table

|  | A | B | C |
|---|---|---|---|
| 0.5 min_____centimeters__ | 0.2 | 0.2 | 2.0 |
| 1.0 min_____do____ | 2.0 | 2.5 | 5.0 |
| 2.0 min_____do____ | 3.0 | 3.5 | 8.0 |
| 5.0 min_____do____ | 6.5 | 6.5 | ------ |
| 10.0 min_____do____ | 7.0 | 7.5 | ------ |
| 15.0 min_____do____ | 8.0 | 8.0 | ------ |
| Volume of sludge_____parts__ | 98.0 | 70.0 | 36.8 |

This data shows that complete sedimentation was effected in less than two minutes when the magnetic flocculation was carried on in the field of an electro-magnet, as compared with a period of fifteen minutes required for complete sedimentation when not carried on in a magnetic field. It also shows that, through the use of a magnetic field, the sludge was reduced or compacted to approximately 35% of the volume occupied by such sludge under conventional coagulation processes. This volume of sludge is also less than 60% of the volume produced by the activated sludge process. An examination of the sludge produced by magnetic flocculation indicated that this form of sludge is much easier to handle than that produced by other coagulation processes. Thus through the use of magnetic flocculation, the period of sedimentation is reduced from 75% to 90%, the volume of sludge obtained is reduced by 65% and the quality of the sludge so produced makes it much more easily handled.

The purification of potable water is another field in which this new process of magnetic flocculation is of particular value. Because of the decrease in time required for sedimentation, the sedimentation capacity of existing settling basins is increased from 500 to 1,000%, thus making possible the purification of a much larger quantity of potable water. The cost of settling basins relative to their capacity is an important factor in water purification processes and the present process greatly lowers this cost ratio by increasing plant capacity.

The process of magnetic flocculation is also highly efficient when applied to high specific gravity wastes such as distillery wastes, strawboard wastes and wastes from the manufacture of yeast and whey. Because of the high specific gravity of such wastes, they cannot be settled out after flocculation, unless the raw waste is diluted with four to six times its volume of water. When magnetic flocculation is applied to such wastes, it is entirely unnecessary to make any dilutions thereof and complete sedimentation is obtained in a much shorter time. Approximately 500 pounds of magnetic material may be added per million gallons of the usual raw waste obtained from a yeast plant. Not only is the sedimentation effected in a very short period without dilution, but the volume of sludge obtained is approximately 20% of the volume obtained by conventional coagulation processes after dilution.

The herein disclosed process of magnetic flocculation is also particularly applicable to the treatment of activated sludge. The activated sludge process produces a large volume of sludge incident to the operation of that process. The sludge so produced is a voluminous product of a very gelatinous nature, very difficult to de-water and very difficult to dry. Present de-watering processes involve conditioning with ferric chloride and lime, but this results in the production of enormous quantities of sludge which, even after de-watering, contain less than 0.5% of solids by weight.

By applying approximately 800 pounds of magnetic material per million gallons of liquid being treated by the activated sludge process, the volume of the sludge obtained will be reduced by approximately 80% and the period of sedimentation will also be materially reduced. It will thus be seen that magnetic flocculation is a valuable process for the conditioning of activated sludge.

The application of this magnetic flocculation process to conventional purification methods proceeds in general as follows. There is first added to the polluted liquid ferric chloride, and the solution agitated for four minutes to permit hydrolysis whereby hydrous ferric oxide is formed. The hydrous ferric oxide effects desolvation of solvated colloids. A quantity of lime is then added in order to negatively charge the colloidal organic matter, and an adsorbent added to remove the organic matter in true solution. The adsorbent is in a finely powdered form and thus forms a suspension in the liquid being treated. Next, the solution is agitated for four minutes, whereupon all the colloids reach maximum cataphoretic velocity. The addition of an electrolyte such as calcium chloride furnishes positive ions to combine with the negatively charged colloids and convert them into suspensoids. The remaining organic matter in the polluted liquid will be present as naturally occurring suspended matter. At this point, any of the magnetic materials above described may be added.

Accordingly, the resultant liquid contains magnetic materials and organic matter, all of which are present in suspended form. To this mixture may be added the usual coagulants such as aluminum, ferric and ferrous salts, to bring about the coagulation process. A magnetic field may then be applied to the liquid being treated which results in the rapid precipitation of the flocs formed by the coagulation. The precipitate produced by the coagulants will, with the aid of the magnetic field, form a sludge within a very short time period. The sludge obtained in this manner will be found to have a volume approximately 25% of the volume of sludge normally obtained by coagulation methods not employing magnetic materials.

It will be obvious that many variations of the above described general procedure may be employed. For example, the magnetic materials may be added prior to the addition of any of the other reagents. It will also be obvious that many other adsorbents, desolvating agents, flocculating agents and coagulating agents may be employed in lieu of those which have been enumerated. Furthermore, it will be obvious, from the teachings of this disclosure, that magnetic materials may be used in the treatment of many types of liquids containing suspended matter which it is desired to remove from the liquid. Accordingly, it will be expressly understood that the foregoing description is exemplary only and that the scope of this invention is not to be limited thereby beyond the scope of the subjoined claims.

Having thus described our invention, we claim:

1. A process for treating liquids containing organic impurities which comprises adding thereto a magnetic material and precipitating said material and impurities by means of a magnetic field.

2. A process for removing suspended organic matter from a liquid, which comprises adding thereto a coagulating material and a powdered magnetic material to form a mixture of coagulated suspended organic matter and said magnetic material, and precipitating said mixture by means of a magnetic field.

3. A process for removing organic matter in true solution from a liquid which comprises adding thereto a material capable of adsorbing said organic matter, a coagulating material and a powdered magnetic material to form a mixture of coagulated adsorbent material with adsorbed organic matter and said magnetic material, and precipitating said mixture by means of a magnetic field.

4. A process for removing colloidal organic matter from a liquid which comprises adding thereto an electrolyte and lime to desolvate and flocculate said colloidal organic matter, adding a coagulating material and a powdered magnetic material to form a mixture of coagulated flocculated organic matter and said magnetic material, and precipitating said mixture by means of a magnetic field.

5. A process for removing organic matter from a liquid which comprises adding thereto an adsorbent material for the organic matter in true solution, a coagulating material for suspended organic matter, and a powdered magnetic material to form a mixture of coagulated adsorbent with adsorbed organic matter, coagulated suspended organic matter and said magnetic material, and precipitating said mixture by means of a magnetic field.

6. A process for removing organic matter from a liquid which comprises adding thereto an electrolyte and lime to desolvate and flocculate the colloidal organic matter in said liquid, a coagulating material for suspended organic matter and a powdered magnetic material to form a mixture of coagulated flocculated organic matter, coagulated suspended organic matter and said magnetic material, and precipitating said mixture by means of a magnetic field.

7. A process for removing organic matter from a liquid which comprises adding thereto an electrolyte and lime to desolvate and flocculate the colloidal organic matter in said liquid, an adsorbent material for the organic matter in true solution, a coagulating material and a powdered magnetic material to form a mixture of coagulated flocculated organic matter, coagulated adsorbent with adsorbed organic matters and said magnetic material, and precipitating said mixture by means of a magnetic field.

8. A process for removing organic matter from a liquid which comprises adding thereto an electrolyte and lime to desolvate and flocculate the colloidal organic matter in said liquid, an adsorbent material for the organic matter in true solution, a coagulating material for suspended organic matter, and a powdered magnetic material to form a mixture of coagulated flocculated organic matter, coagulated adsorbent with adsorbed organic matter, coagulated suspended organic matter and said magnetic material, and precipitating said mixture by means of a magnetic field.

OLIVER M. URBAIN.
WILLIAM R. STEMEN.